PRIVATE-WIRE DATA RECORDING SYSTEM

Filed Nov. 1, 1960 7 Sheets-Sheet 1

INVENTOR
JOHN W. ARNAUD
BY Roy C. Hopgood
ATTORNEY

Feb. 20, 1962 J. W. ARNAUD 3,022,371

PRIVATE-WIRE DATA RECORDING SYSTEM

Filed Nov. 1, 1960 7 Sheets-Sheet 2

INVENTOR
JOHN W. ARNAUD
BY Roy C. Hopgood
ATTORNEY

Feb. 20, 1962 J. W. ARNAUD 3,022,371

PRIVATE-WIRE DATA RECORDING SYSTEM

Filed Nov. 1, 1960 7 Sheets-Sheet 3

CONTROL PANEL 300

INVENTOR
JOHN W. ARNAUD
BY Roy C. Hopgood
ATTORNEY

PRIVATE-WIRE DATA RECORDING SYSTEM

INVENTOR
JOHN W. ARNAUD
BY Roy C. Hopgood
ATTORNEY

PRIVATE-WIRE DATA RECORDING SYSTEM

INVENTOR
JOHN W. ARNAUD
BY Roy C. Hopgood
ATTORNEY

Feb. 20, 1962 J. W. ARNAUD 3,022,371

PRIVATE-WIRE DATA RECORDING SYSTEM

Filed Nov. 1, 1960 7 Sheets-Sheet 6

INVENTOR
JOHN W. ARNAUD
BY Roy C. Hopgood
ATTORNEY

PRIVATE-WIRE DATA RECORDING SYSTEM

Filed Nov. 1, 1960 7 Sheets-Sheet 7

INVENTOR
JOHN W. ARNAUD
BY Roy C. Hopgood
ATTORNEY

United States Patent Office 3,022,371
Patented Feb. 20, 1962

3,022,371
PRIVATE-WIRE DATA RECORDING SYSTEM

John W. Arnaud, % Monitron Service Corporation, 551 5th Ave., New York 17, N.Y.

Filed Nov. 1, 1960, Ser. No. 66,515
16 Claims. (Cl. 178—2)

This invention relates in general to private wire communication systems and in particular to data recording systems therefor. Its principal object is to provide a recording system of the above character which provides a communications manager with a complete and current picture of the constantly changing conditions of the communications system utilized by his company.

Present day companies have found an increasing need for direct wire communication with their subsidiaries, divisions, branch offices and sales offices which may be located in widely separated cities. This need has been met by private wire systems, commonly termed teletypewriter systems, which interconnect the above offices with one another such that messages therebetween may be rapidly and accurately exchanged. In average companies, each of the associated offices will be made a separate station, all connected to the same private-wire circuit, and each assigned an identifying code, such as an alphabetical abbreviation. Any such station may, by proper control, transmit messages to any other station over the private-wire circuit with complete secrecy and a minimum of delay.

These private-wire communication systems are subject to varying traffic conditions and in order to provide the ultimate in service to his company, the communications manager must be aware of traffic demands at all times. Accordingly, it is an object of this invention to provide apparatus which detects each message transmitted and prints a corresponding unit record, such as a punched card, which contains information relating to the originating and receiving station designation, the time of transmission and the elapsed time of the message. The recorded information must be placed on the cards so that they can be rapidly processed by automatic equipment to prepare various established reports from which the communication manager obtains timely information relating to the point-to-point traffic, the pattern of such traffic and the amount of traffic from each station. This information can be processed further to determine the percentage of utilization of the communications equipment in order to determine the amount needed for the most efficient communication operations.

Prior-art data recording systems are known, such as automatic telephone toll-ticketing systems, wherein data entries are recorded which relate to calling station and called station identification, the central office designation, and the time of beginning and termination of each call. Examples of such systems utilizing punched cards are disclosed in U.S. Patent Nos. 2,513,112 and 2,668,875. However, these toll-ticketing data recording systems are feasible only in areas employing universal numbering schemes wherein all telephone numbers contain the same number of digits. For example, in nationwide toll dialing systems, ten digits are needed to identify each telephone station, the first three digits (area code) indexing the territorial area, the next three digits (office code) identifying the exchange within the indexed area, and the last four digits (local number) selecting the desired station in the identified exchange. Thus, in these toll-ticketing systems, the field on the punched card for recording call and traffic information is fixed for all calls and no problems exist in controlling the punch equipment to place the incoming information in the proper card columns. However, in private-wire communication systems wherein no universal station codings or abbreviations are in general use, problems arise in controlling the punching apparatus to detect the spacing and varying number of characters in the station codes so that the sending and receiving station information appears in predetermined card fields in order to enhance card processing. Accordingly, it is another object of this invention to provide apparatus and control circuitry therefor, for responding to a wide variety of codes of varying number of characters and spacing, and for controlling the punch equipment to punch such information in predetermined columns and fields.

Another problem present in private-wire data recording systems and not present in the toll-ticketing systems concerns itself with random signals inadvertently inserted in a message by the operator preparing such message. More specifically, the person typing the message for the sender may insert a single space character between the calling and called station designations or may insert any variable number of such spaces depending upon personal desires or habits. Since these space characters comprise transmitted signals, the punching of data in proper columns in the record cards is rendered more difficult. Accordingly, it is a further object of this invention to provide apparatus and control circuitry therefor for responding to proper space characters and for disregarding any additional or superfluous space or other signal characters.

Other objects and features are concerned with providing suitable termination points for interconnecting main control points of the data-recording circuitry to promote flexibility in assigning card fields to meet unlimited station code abbreviations and varying numbers of data entries.

The foregoing, and other objects and features not above enumerated, will become apparent and the invention will be best understood by reference to a preferred embodiment shown in the accompanying drawings, comprising FIGS. 1 to 8 wherein.

Figure 1:
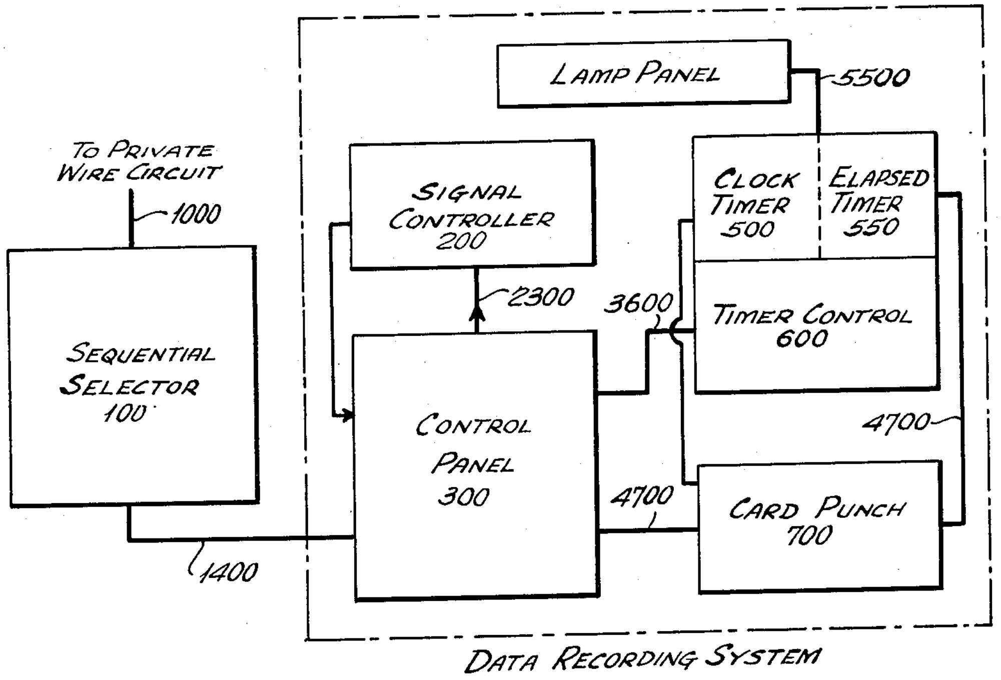
FIG. 1 shows a block diagram of the data recording apparatus of the invention.
Figure 8:
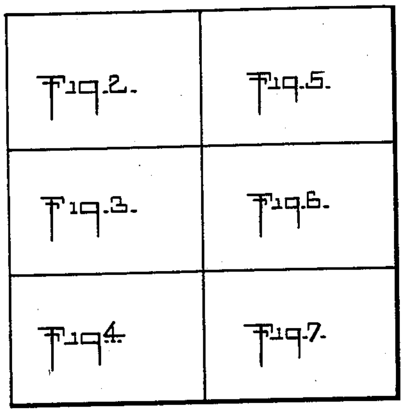
FIG. 8 shows the way in which the sheets of drawings containing FIGS. 2 to 7 should be arranged for a complete understanding of the invention.

Since the invention is concerned with recording data transmitted over private-wire circuits, a general description will be given of the type of signals and message format commonly used in teletypewriter practice. While no universal teletypewriter station-identification scheme is employed, as above noted, a set of generally accepted operating procedures have been adopted which are used in preparing messages.

Normally, all messages are prepared on perforated paper tape and inserted in the communications transmitter and are automatically transmitted when the private-wire circuit becomes idle. With no traffic on the circuit, a series of transmitter start codes (TSC) are continuously and automatically transmitted and serve to successively and sequentially interrogate each of the stations to determine whether any station has a message tape inserted in the transmitter. These transmitter start codes are usually two-character signals, such as QA, for example. As each station is interrogated, it automatically transmits the character "V" to signify it has no message awaiting transmission or it automatically begins to transmit the message on the tape inserted in the transmitter.

The usual tape message will consist of a first group of "letters" signals (LTRS), usually five or more, which are inserted in the tape to insure sufficient time for the switching apparatus to clear out from the previous message transmission. These LTRS signals are followed by the call direction code (CDC) or address code for the calling station. Such call direction codes usually are two character signals. The CDC for the calling station is followed by a series of LTRS signals which provide time for switching operations. Thereafter, the CDC signals for the called station will appear, followed by another series of LTRS signals.

These transmitted CDC signals of the called station,

| Station | Abbreviation | TSC | CDC |
|---|---|---|---|
| Cleveland | CLEVE | QA | GN |
| Dallas | DAL | QB | GR |
| Denver | DEN | QC | GE |
| Houston | HOUS | QD | GP |
| Kansas City | KC | QE | GC |
| New York-Grand Central | NY GC | QF | GS |

From the foregoing description of controlling signals normally employed in private-wire circuits, a message format of the heading and first line of a call from Davis in Kansas City to Jones in Cleveland on September 10, 1960 at a quarter after eleven in the morning will appear as follows:

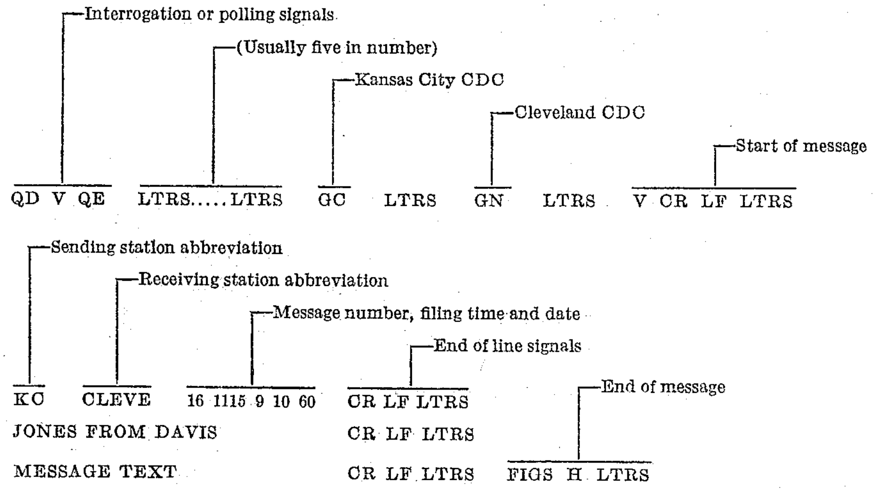

will seize the called station receiving equipment, which responds as if interrogated, by automatically transmitting the character "V" signal. The message tape in the transmitter at the sending station will then send a "carriage return" signal (CR), a "line-feed" signal (LF) and a LTRS signal in sequence. The above sequence of signals will be followed by the signals of the first line or heading of the message. Thus, monitoring equipment will be able to detect the point in the transmission when any message heading will be transmitted if such equipment is arranged to respond to the V-CR-LF-LTRS signal sequence.

The first line of the message will comprise any variable number of character signals representing the abbreviation of the calling station followed by one or several "space" signals and then by a variable number of character signals representing the abbreviation of the called station. Thereafter, signals representing the message number, filing time and date are transmitted. After the date signals, a CR-LF-LTRS signal will be sent in sequence. This CR-LF-LTRS signal sequence is an end-of-line signal (the first line in this case) and immediately precedes the actual message which may include the names of the receiving person and the sending person in addition to the text of the message.

The last word of the text will be followed by a CR-LF-LTRS signal sequence and then by a FIGS-H-LTRS signal sequence. The FIGS-H-LTRS signal sequence serves as an "end-of-message" or "disconnect" signal which clears out the switching apparatus. Thereafter, the transmitter start codes (TSC) will automatically be transmitted in order to connect with another message transmitter having a message tape inserted therein.

The following table shows a list of stations on a typical private-wire circuit, together with their respective abbreviations, transmitter start codes (TSC) and call directing codes (CDC).

From the foregoing message format, it can be seen that the first positive sequence of characters that is associated with a message is the V-CR-LF-LTRS signals. If a circuit was being monitored, this sequence of signals would be ideal to control the starting of the data-recording apparatus. However, at this point of the transmission, the standard call directing codes of both the sending and receiving stations have been transmitted and no recording made thereof. The only other information concerning the sending and receiving stations, after the start-of-message signal sequence, is the abbreviations for such stations. As noted, these abbreviations vary in accordance with the particular operator preparing the message. Thus, in order to avoid undesirable continuous monitoring and recording of polling or interrogating signals and yet be able to record station-identifying information, the data-recording apparatus must be arranged to distinguish these noted varying station abbreviations. As will appear hereinafter, the data-recording apparatus of the present invention accomplishes this latter discrimination.

The start-of-message signals, and end-of-line signals and the end-of-message signals are composed of a predetermined sequence of character groups, and apparatus known as a sequentially operated teleprinter universal selector is employed to detect these and other predetermined sequences. Such a selector is described in U.S. Patent Nos. 2,543,174 and 2,568,264 and functions to receive permutation code telegraph signals and to operate selectable elements in response to the reception of predetermined sequences of code combinations. Such a selector can be arranged to detect when the start-of-message code V-CR-LF-LTRS is received and to deliver a single impulse to a predetermined wire assigned such code. The selector will detect the insertion of an undesired character or characters lying within the above series and be non-responsive thereto. Examples of the sequences which a sequential selector will detect include, but is not limited to, the following:

(1) Five level Baudot codes which are received in series and appear as simultaneous impulses on five parallel tines or outputs;

(2) A combination of characters (V-CR-LF-LTRS) that signal the beginning of a message;

(3) A combination of characters (CR-LF-LTRS) that signal the end of a line;

(4) A combination of characters (FIGS-H-LTRS) that signal the end of a message;

(5) A space character; and (6) Other codes or combinations, such as FIGS-M, that may be required to properly control the data recording system.

GENERAL DESCRIPTION

Referring now to FIG. 1 of the drawings, a brief description of the operation of the data recording system will be given.

The data recording system shown in FIG. 1 is arranged to continuously monitor one private-wire circuit regardless of the number of stations served thereby. This system comprises a sequential selector 100 which is connected, by a suitable loop circuit, over conductors in cable 1000, to the private-wire circuit and connected by conductors in cable 1400 to control panel 300.

When a start-of-message signal, (V-CR-LF-LTRS) is received by selector 100, an impulse is transmitted to control panel 300 which through proper jumpers operates signal controller 200, provided the card punch 700 is properly positioned.

Signal controller 200 responds to the noted impulse and selectively connects certain jumpers between the signal selector 100 and card punch 700 in preparation for the group of characters representing the calling station abbreviation to be recorded in coded form and in proper successive columns on a record card. After such calling station information is recorded, controller 200 causes the called station abbreviation to be recorded in coded form on other columns on the record which are assigned for called station abbreviations.

It can be seen that the varying punching techniques of the operators preparing the message tape will adversely affect the field definition of the card punch machine unless suitable translating apparatus is provided. As will be described hereinafter, the signal controller in conjunction with control panel 300 evaluates the sending station abbreviation with respect to the number of characters received, the specific characters received and the spacing of such characters.

After the receiving station abbreviation is properly punched and the first end-of-line signal sequence is received, the controller and control panel cooperate to operate the timer control 600 to send signals from timer 500 to punch 700 to record the time of the start of the message. At the same time, timer 550 is started into operation to time the duration of the call. When the end-of-message signal sequence is received, timer control 600 is again operated to cause the timer 550 to send signals to punch 700 indicative of the duration of the message. Thereafter, the punch will automatically eject the completely punched record card and all equipment will be returned to normal in preparation for receiving and recording traffic information concerning another message.

Since the recorded information is positioned in predetermined column fields, the punched cards may be processed readily and printed records be made therefrom.

The control relays in controller 200 are arranged in four groups and perform the following switching operations.

The twelve relays 101 to 112 in the first group are storage relays which respond to predetermined function signals generated by selector 100. Each of these relays has a break-make contact assembly which is jumper-connected through control panel 300 to perform various control operations. In the preferred embodiment, only five of these relays are used, however any desired number may be utilized, depending upon the number of function signals to be stored.

Figure 2:
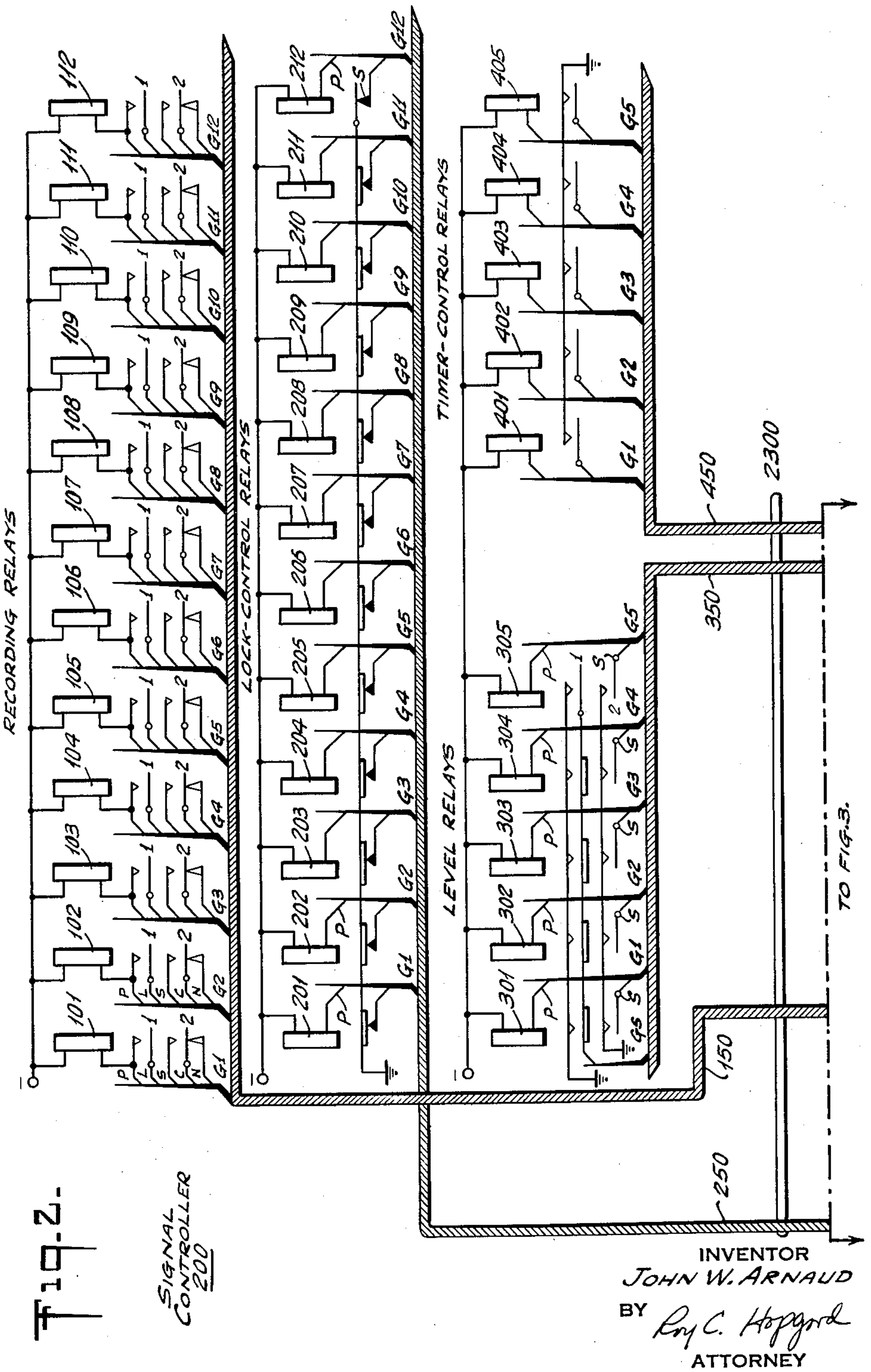
FIG. 2 shows a circuit diagram of a signal controller, which in response to predetermined signals, selects and controls the operation of other items of control apparatus.

The twelve relays 201 to 212 in the second group of relays in FIG. 2 are storage clearout relays. These relays each includes a set of break contacts through which the locking circuit of the relays 101 to 112 are controlled. When a storage relay has performed its control operation, the assigned one of the relays 201 to 212 is operated and the storage relay assigned thereto by jumpers is released. The number of these relays that are used also vary according to the number of control functions desired.

The five relays 301 to 305 are level-control relays which individually respond to the mark or space signals in accordance with the Baudot code or any other suitable code used in the private-wire system. These relays have large current-carrying contacts which are provided to operate the heavy-current relays in card punch 700 since the contacts in the sequential selector are of small current-carrying capacity. These relays, once operated, remain operated only as long as a mark signal appears on its corresponding level wire.

The five relays 401 to 405 respond to predetermined function signals to close operating circuits to control timers 500 and 550. These relays perform their control operation and thereafter release since none of the relays lock operated.

Figure 3:
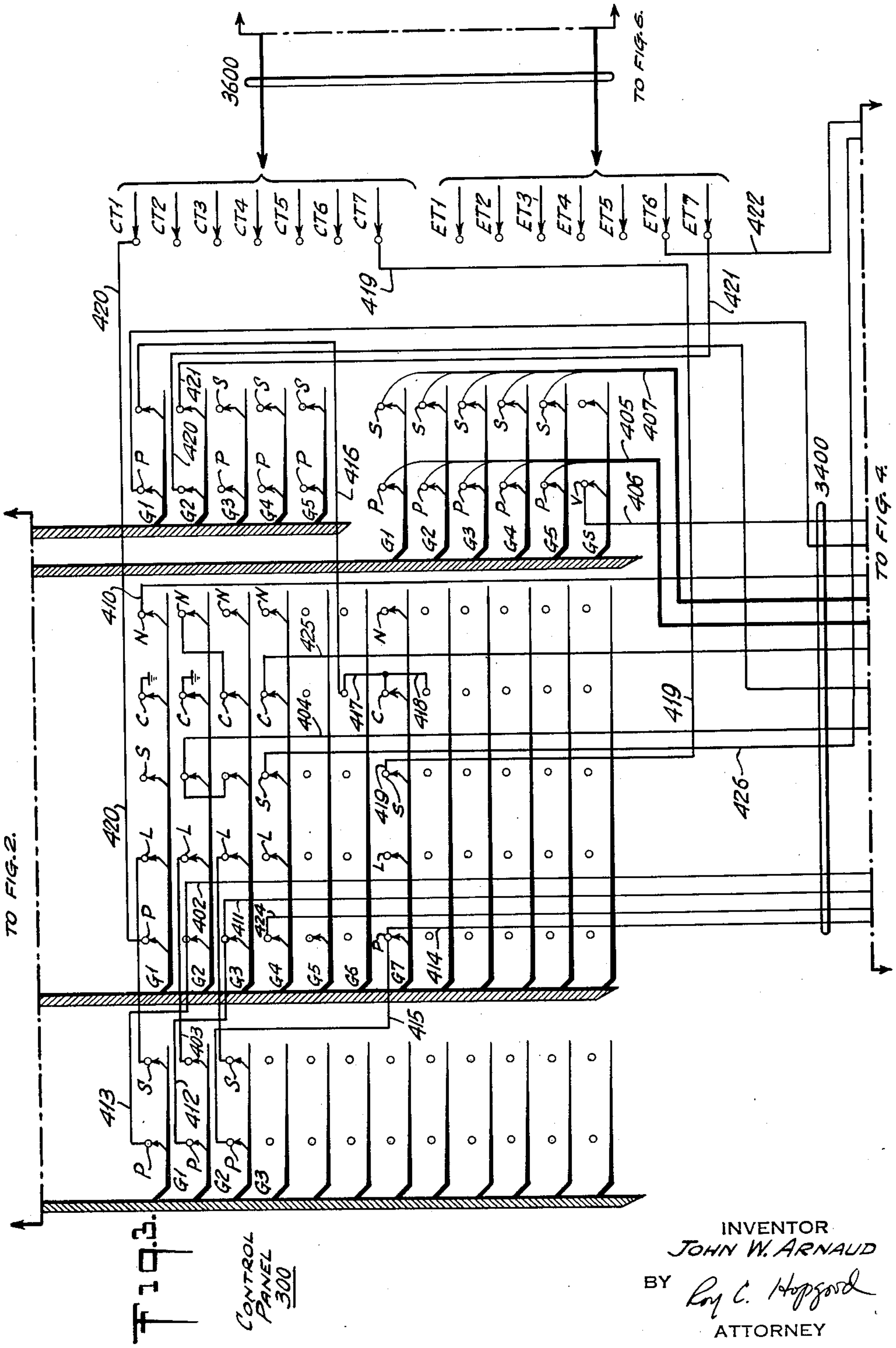
FIGS. 3 and 4 show a control panel containing a plurality of termination points which are arranged to receive patch cords or jumpers to selectively interconnect the various items of apparatus.
Figure 4:
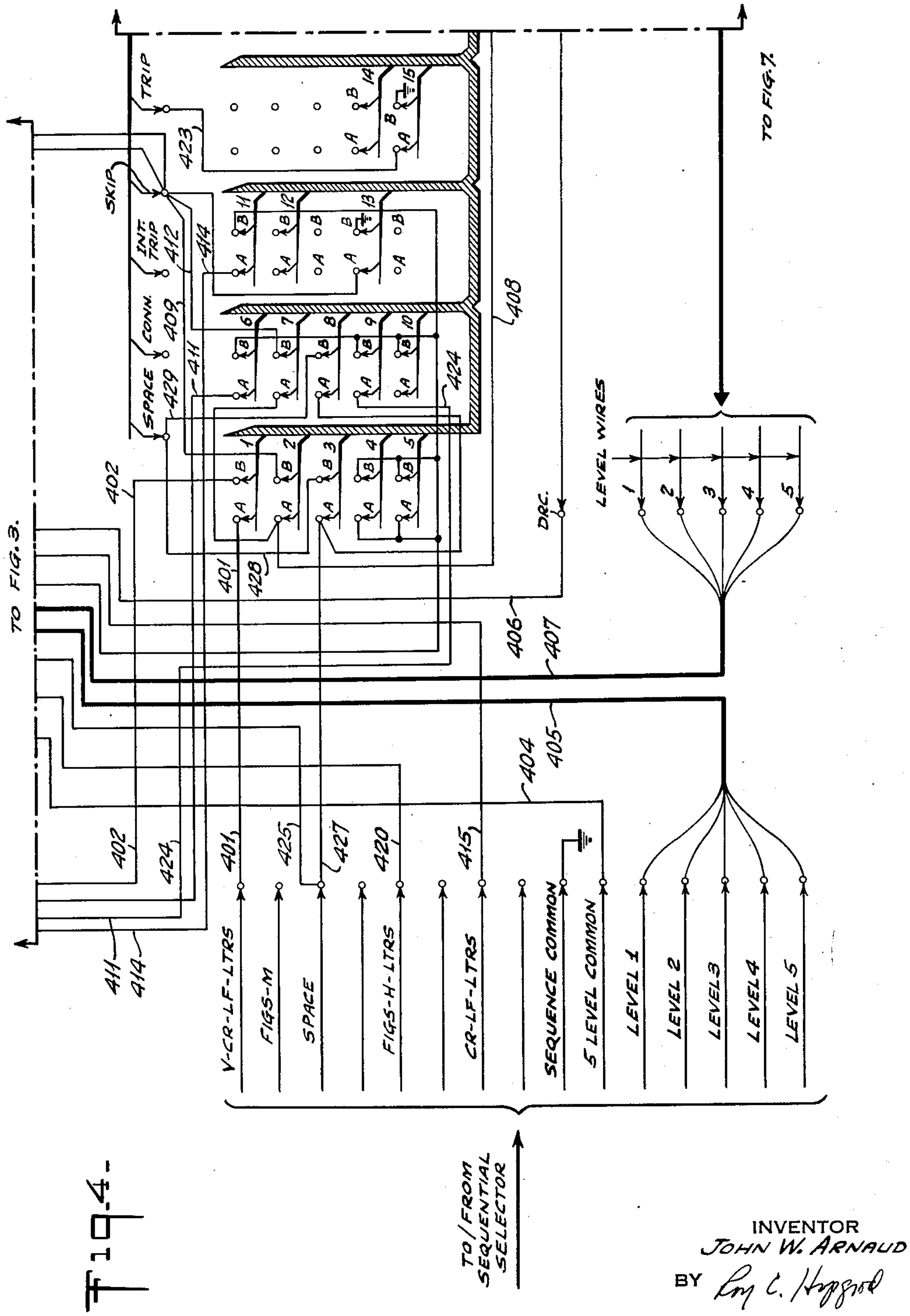

The control panel 300, shown in FIGS. 3 and 4, contains a plurality of separate hubs or terminals which terminate the permanent wiring from the associated signal controller, card punch and timing apparatus. The conductors forming part of the permanent wiring are shown connected to the terminals and supplied with arrowheads. The wires representing jumpers or patchcords, each having a male plug at each end, are shown as normal connections to the terminals.

All signals and impulses received directly from the line through selector 100 are terminated on the control panel. Likewise, the control wires of all relays of controller 200, the control wires from the timing equipment and the card punch are terminated on the control panel. In this way, any terminal may be connected to any other by a suitable patchcord. While several patchcords are shown connected to one terminal, this single terminal is representative of several vacant terminals interconnected to provide suitable termination points.

The clock timer 500 and associated stepping switches SW1 to SW3 operate to deliver pulses to card punch 700 in response to predetermined control signals. These pulses are used to punch, in a card record, the time of day that a message is received. The timer 500 is a three-position timer, with the first two positions indicating the hour (00 to 24) and the third position indicating the tenths of hours (.10).

The elapsed timer 550, containing switches SW4 and SW5, is started when a message is received and has two positions corresponding to the minutes and tenths of minutes, respectively, that lapse during a single message. When the sending of a message is completed, the elapsed timer 550 is actuated and impulses indicative of the time of duration of the message is transmitted to card punch 700 for recordation as noted.

The timer control relays 600 include timing motors and associated cams for accurately advancing the stepping switches to positionally record the above time informations. Three control relays T1 to T3 are provided which respond to time-spaced controls from the control panel to cause the read-out of the mechanical position of the switches.

The card punch 700 is any well-known commercial card punch, preferably one having 90-column control. A sliding contact-actuating link 790 is added to such card punch to actuate contact sets CS1 to CS15 associated with various columns of the punch. More specifically, the contact set or column switch CS1, associated with wire group 1 of cable 4700, is mechanically positioned on punch 700 so that it is mechanically operated only when the punch carriage is setting on punch column 18. Similarly, switch CS2 operated when the carriage moves to column 19 and switch CS1 is thereupon restored. As will appear hereinafter, these column switches are assigned to carriage positions in predetermined order to control the field definition of the cards being punched.

In addition to the column switches, punch 700 contains terminals for controlling card and punch operations, such as spacing controls, skipping or tabulating controls, eject controls and connect controls. These controls and the relays provided in punch 700 will be described more fully in connection with the description of a message being recorded.

DETAILED DESCRIPTION

A detailed description will now be given of a call from a sending station having a two-character abbreviation to a receiving station having a five-character abbreviation. At this time, it is assumed that power is first turned on and clock timer 500 is properly set and begins normal clock operations.

*Start-of-message signals*

Assuming, as noted for the preceding message format, that the first character sequence detected by sequential selector 100 is V-CR-LF-LTRS. As part of its operation, selector 100 places a ground potential on the terminal of control panel 300 which is designated V-CR-LF-LTRS. This ground is extended over jumper 401 to terminal A of wire group 1 of cable 471 and will be transferred to terminal B of the same wire group if the contact-actuating link 790 is in association with column switch CS1. As noted, switch CS1 will be closed only if the carriage of punch 700 is positioned on column 18.

Assuming that the first 17 columns of card punch 700 were actuated automatically for the recording of data not pertinent to the instant invention, then the punch carriage is positioned on column 18 and column switch CS1 is closed.

It has been chosen to assign columns 18 to 22 of the 90-column card for the sending station abbreviations; columns 23 to 27 for the receiving station abbreviation; columns 28 to 30 for the clock timer information; and columns 36 and 37 for the elapsed timer information. The remaining columns may be used to automatically record the day, month and year and the message number. Thus, card punch 700 must respond to signals received from sequential selector 100 and punch the proper information in the proper column, spacing and skipping of columns being accomplished when necessary.

The ground on terminal A of wire group 1 of cable 471 is extended to terminal B as noted and is further extended over jumper 402 to the battery-connected winding of relay 102 through terminal P of wire group G2 of cable 150. At the same time this ground is extended to the battery-connected winding of relay 201.

Relay 102 operates and locks through its contacts 1 to ground appearing on normally closed contacts of relay 202, which serves as a locking relay for relay 102. The locking path for relay 102 includes conductor L of wire group G2 of cable 150, terminal L of the terminal field associated with wire group G2, jumper 403, terminal S and conductor S of wire group G2 of cable 250 and break contacts on relay 202. At this time, contacts 2 of relay 102 extend the ground potential appearing on terminal C of wire group G2 of cable 250 to terminal S of the same group which is connected by jumper 404 to the 5-level common extending to selector 100. This ground is extended through level contacts (not shown) in selector 100 to the concerned level wires 1 to 5, in accordance with the permutations of the characters of the sending station abbreviation. The operating and locking ground potential for relay 102 is also extended to the battery connected winding of relay 201 over jumper 413, as noted. Relay 201 operates and restores relay 101, if operated from a previous recording operation by the clock timer cams.

*1st letter of sending station abbreviation*

Assuming the sending station to be Kansas City as noted on the typical message format, the first letter received will be K and the level wires 1 to 5 will be energized according to the code employed. Assuming that the Baudot code is used then level wires 1 to 4 are energized from the noted ground potential on the 5-level common. The corresponding jumpers in jumper group 405 extend these ground potentials to terminal P of the respective one of the wire groups G1 to G5 of cable 350, thereby energizing relays 301 to 304.

Relays 301 to 304 operate and at their heavy duty "make first"contacts 1 extend ground potential over conductor V of cable 350 of terminal V of wire group GS thereof. This ground potential is further extended over jumper 406 to terminal DRC which is connected to the decoding relays contact matrix in card punch 700. After contacts 1 of relays 301 to 304 close, the heavy-duty contacts 2 thereon close and extend ground potential on corresponding conductors S of respective ones of the wire groups G1 to G5 of cable 350 to associated terminals S. Corresponding ones of the jumper wires in jumper group 407 further extend these ground potentials through the card punch level wires to the corresponding ones of the five decoding relays R1 to R5 of card punch 700.

Decoding relays R1 to R4 of card punch 700 operate and extend the ground potential on terminal DRC to the character relay K (not shown) which corresponds to the permutation code MMMMS received by selector 100.

Contacts (not shown) on the operated character relay set and actuate the punch levers of the card punch so that the letter K of the Kansas City abbreviation is punched in column 18 of a record card individual to the incoming message. Immediately, thereafter, the column carriage (not shown) moves to column 19 and link 790 closes column switch CS2 and opens column switch CS1.

When switch CS1 opens, it opened the operate circuit of relay 102 but relay 102 remained operated from its locking circuit through break contacts 1 of relay 202.

Since none of the stations abbreviations of the stations assigned the private wire circuit under description and listed in the foregoing table have a single letter, the next letter of the sending station abbreviation should be recorded in column 19 of the card.

After a predetermined time interval, selector 100 removes the ground potentials from the level wires. This removal of ground potential permits the operated ones of the relays 301 to 305 to restore, thereby restoring the operated decoding relays and the operated character relay. At this time relays 102 and 202 are operated, the punch carriage is positioned on column 19 and column switch CS2 is closed. The data recording equipment is now prepared to receive the next letter of the sending station designation.

*2nd letter of sending station abbreviation*

When the second letter (C) of the sending station abbreviation is received, selector 100 extends ground potential on the level wires 2 to 4 which correspond to the Baudot code for letter "C." These ground potentials on the level wires operate the corresponding level relays 302 to 304 in the manner hereinbefore described. These relays operate corresponding ones of the decoding relays in card punch 700 and the ground potential on terminal DRC is extended through the contact matrix of relays R2 to R4 and energize the character relay C which, as hereinbefore noted, causes the punches on column 19 to be set in accordance with the code for the letter C and thereafter operated to record the letter "C" code information in column 19.

Since the sending station abbreviation contains only two letters, the operator would normally insert a space character before the receiving station abbreviation is sent. The data-recording system could be easily arranged to respond to this space signal and cause the punch carriage to advance to column 23 in preparation for recording the receiving station abbreviation. However, since the New York-Grand Central abbreviation contains a space after the first two letters, such advancement of the carriage in response to a space signal after two letters were recorded could result in the characters appearing in the receiving station column field and give an erroneous recording. Accordingly, the data-processing apparatus must be controlled to discriminate between abbreviations containing only two characters (KC) and those containing four characters with a space between the first and last two character pairs (NY GC).

A study of the abbreviation of the stations on the private-wire circuit under discussion reveals that the last letter of the abbreviation KC does not appear in a similar location in any other abbreviation. Thus, the data processing equipment is conditioned to respond to the recording of the letter C in column 19 by immediately advancing to column 23 in preparation for recording the first letter of the receiving station designation. The following description sets forth this operation.

The ground potential appearing on the operating winding of character relay "C" is extended over jumper 408 to terminal A of wire group 2 of cable 471. Since carriage link 790 is now positioned on column switch CS2, this ground potential is extended through switch CS2, and to terminal B of wire group 2 of cable 471 which is connected to the SKIP terminal over jumper 409. The SKIP terminal, when grounded, responds in generally the same manner as a tabulator control on a typewriter and causes the punch carriage to advance to the tab position which is set on column 23, the first column of the receiving station abbreviation field.

It will be noted that numerous combinations of interconnected character relays and column switches can be provided so that discrimination between two-character abbreviations and four-character abbreviations separated by spaces can be easily accomplished.

While the combination of character relay C and column switches CS2 was described, it is to be understood that similar combinations can be provided for any one of the column switches and any one of the character relays.

As before described, following the recording of a five-code character, selector 100 restores the operated level relays, the decoding relays and the character relay.

When the punch carriage advanced to column 23 column switch CS6 closes and ground potential from terminal C of wire group G1 of cable 150 is extended through the break contacts 2 of relay 101, terminal N of the last-said wire group, jumper 410, column switch CS6, jumper 411 and terminal P of wire group G3 of cable 150 to the battery-connected winding of relay 103 and over jumper 412 to the battery-connected winding of relay 202 through terminal P of wire group G2 of cable 250.

Relays 103 and 202 operate. Contacts on relay 202 remove the locking ground from jumpers 403 and 413 causing relays 102 and 201 to restore. At this time ground potential is removed from jumper 404 and the 5-level common.

Contacts on relay 103 re-apply ground potential to jumper 404 from break contacts 2 of relay 102 and make contacts 2 of relay 103, thereby re-grounding the 5-level common conductor extending to selector 100. At this time, the punch carriage is on column 23, column switch CS6 is closed, and relays 103 and 202 are operated. The apparatus is now prepared to receive the first character of the receiving station abbreviation.

*1st character of receiving station abbreviation*

Sequential selector 100 receives the character "C," the first letter of the receiving station abbreviation CLEVE. The ground potential on jumper 404 from break contacts 2 of relay 102 and make contacts 2 of relay 103 is extended over the 5-level common conductor and appears in parallel on level wires 2, 3 and 4 since the Baudot code for the character "C" is SMMMS. These ground potentials are extended over corresponding jumpers in jumper group 405 to the battery-connected windings of relays 302, 303 and 304.

Relays 303 to 304 operate and at their make contacts 1 and 2 cause the operation of decoding relays R2 to R4 and the subsequent operation of character relay C.

The character relay C, through controls not shown, causes the setting and operation of the punches in column 23 to punch the letter C in the record card. The ground potential appearing on conductor 408 is ineffective since the carriage link 790 is positioned on column switch CS6 and column switch CS2 is open. At this time, the punch carriage advances to column 24 and advances link 790 to column switch CS7. Switch CS7 closes and switch CS6 opens. A short time later, the ground potential is removed from the energized level wires and the level relays 302 to 304, the decoding relays R2 to R4 and the character relay C restore. The apparatus is now in condition to receive the second character of the receiving station abbreviation, relays 103 and 202 remaining operated.

*2nd character receiving station abbreviation*

When sequential selector 100 received the character L, (SMSSM) wires 2 and 5 are energized, resulting in the operation of the corresponding character relay L.

In the manner hereinbefore described, the letter L is punched in column 24 of the record card and the carriage is advanced to column 25, advancing link 790 to column switch CS8.

It will be noted that even though link 790 was positioned on column switch SC7 and jumper 408 and 413 are connected thereto, the SKIP control is not energized since the character relay C was not operated. If Kansas City (KC) was the receiving station, relay C would have been energized and jumper 412 energized, resulting in the punch carriage being advanced to column 28 in preparation for receiving the first position signal from the clock timer.

With link 790 on column switch CS8, and the level relays, decoding relays and character relay restored, the data recording apparatus is in condition to receive the next character of the receiving station designation.

*Remaining characters of receiving station*

The 3rd, 4th and 5th characters of the receiving station abbreviation CLEVE will be received as hereinbefore described, causing the punching of these characters in columns 25 to 27 of the record card.

At this time, the punch carriage is positioned on column 28 and link 790 is positioned on column switch CS11. With column switch CS11 closed, ground potential on jumper 410 from the back contacts 2 of relay 101, is extended through switch CS11 to jumper 414 which cause the operation of relays 107 and 203.

When relay 203 operates, its break contacts remove locking ground potential from relay 103 which restores, removing ground potential from the 5-level common conductor extending to sequential selector 100. Relays 107 and 203 remain operated as long as the punch carriage is positioned on column 28.

The next signals transmitted over the line will be a space signal followed by the message number, filing time and date. The appropriate sequential selector 100 contacts will close as this information is received but none of the level wires will be energized since the ground potential is removed from the 5-level common conductor, as noted.

*End-of-line signal (1st line)*

When the transmission of the filing time and date is completed, an end-of-line signal (CR-LF-LTRS) is transmitted as shown in the foregoing message format.

The sequential selector detects such sequence of signals and places a ground potential on conductor CR-LF-LTRS of the control panel of FIG. 3, which ground potential is extended over jumper 415, to terminal P of wire group G1 of cable 450. This terminal is connected to the battery-connected winding of relay 401.

Relay 401 operates and at its make contacts connects ground potential to jumpers 416 and 417 which are connected to terminal C of the wire group associated with operated relay 107. This ground potential is further extended through make contacts 2 of relay 107 and over jumper 419 to terminal CT7 of cable 3600 to cause the recording of the instant time in the record card. Shortly thereafter, ground potential is removed from conductor CR-LF-LTRS and relay 401 restores, removing ground potential from terminal CT7.

Figure 5:
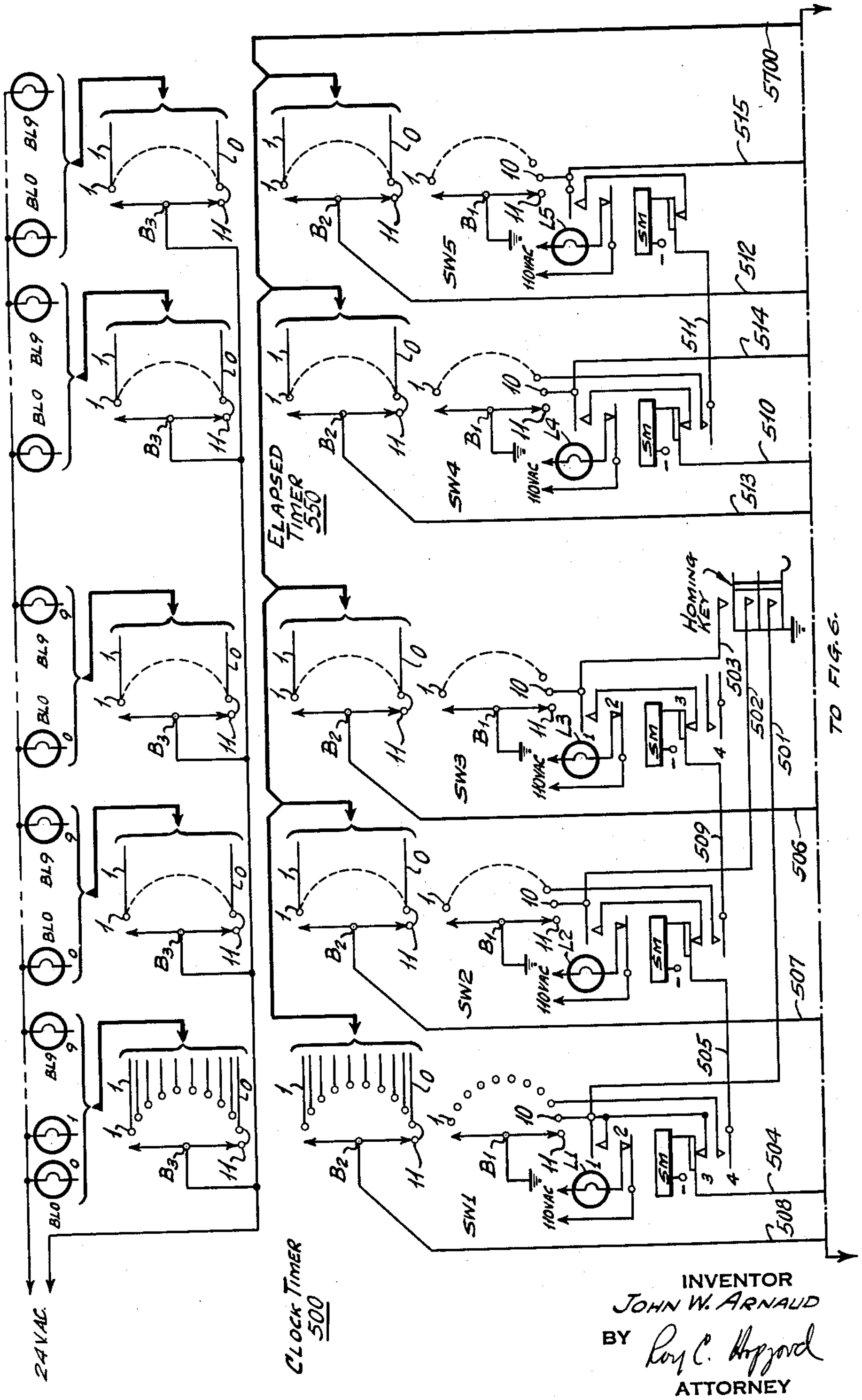
FIGS. 5 and 6 show circuit details of two sets of timer equipments.
Figure 6:
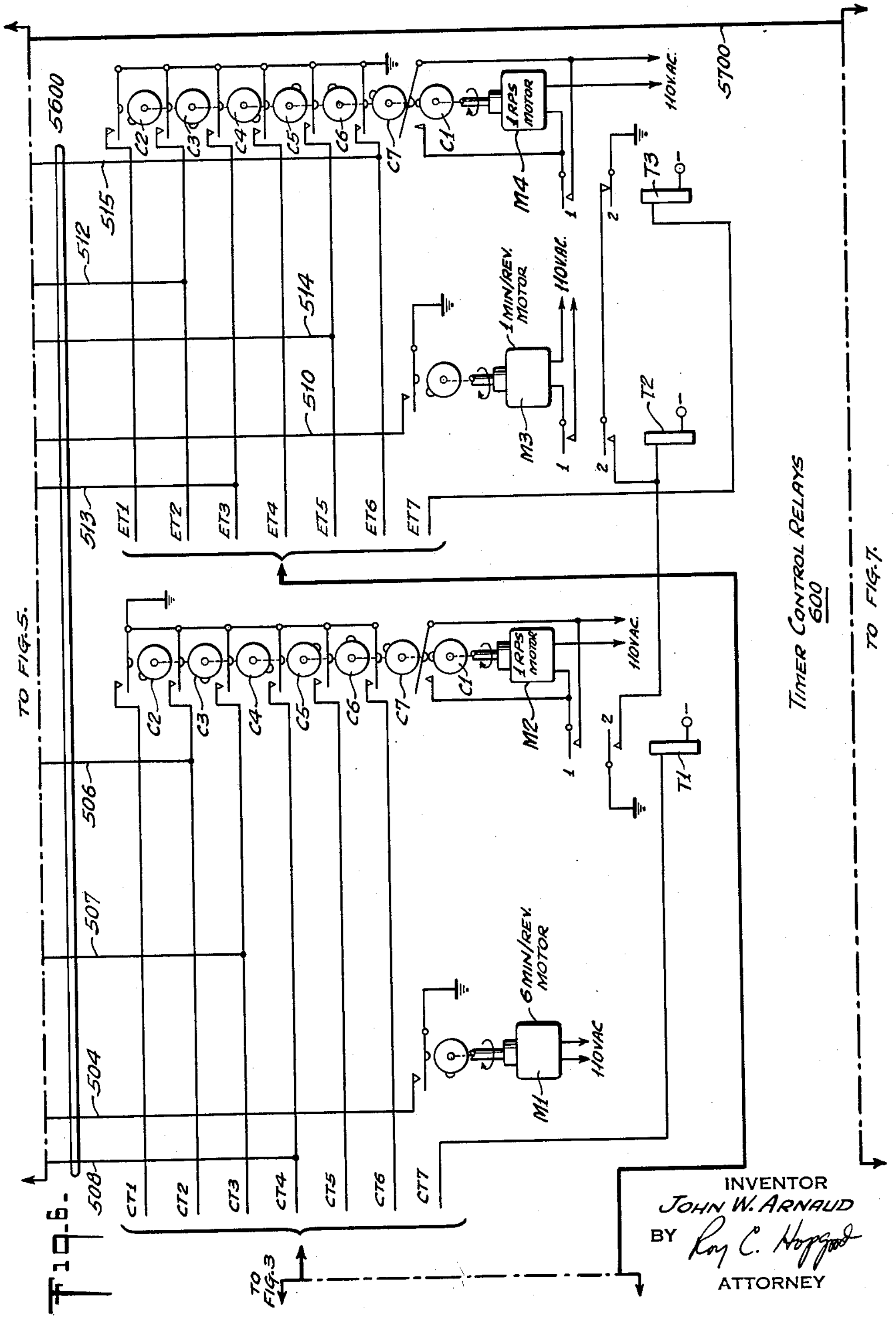
Figure 7:
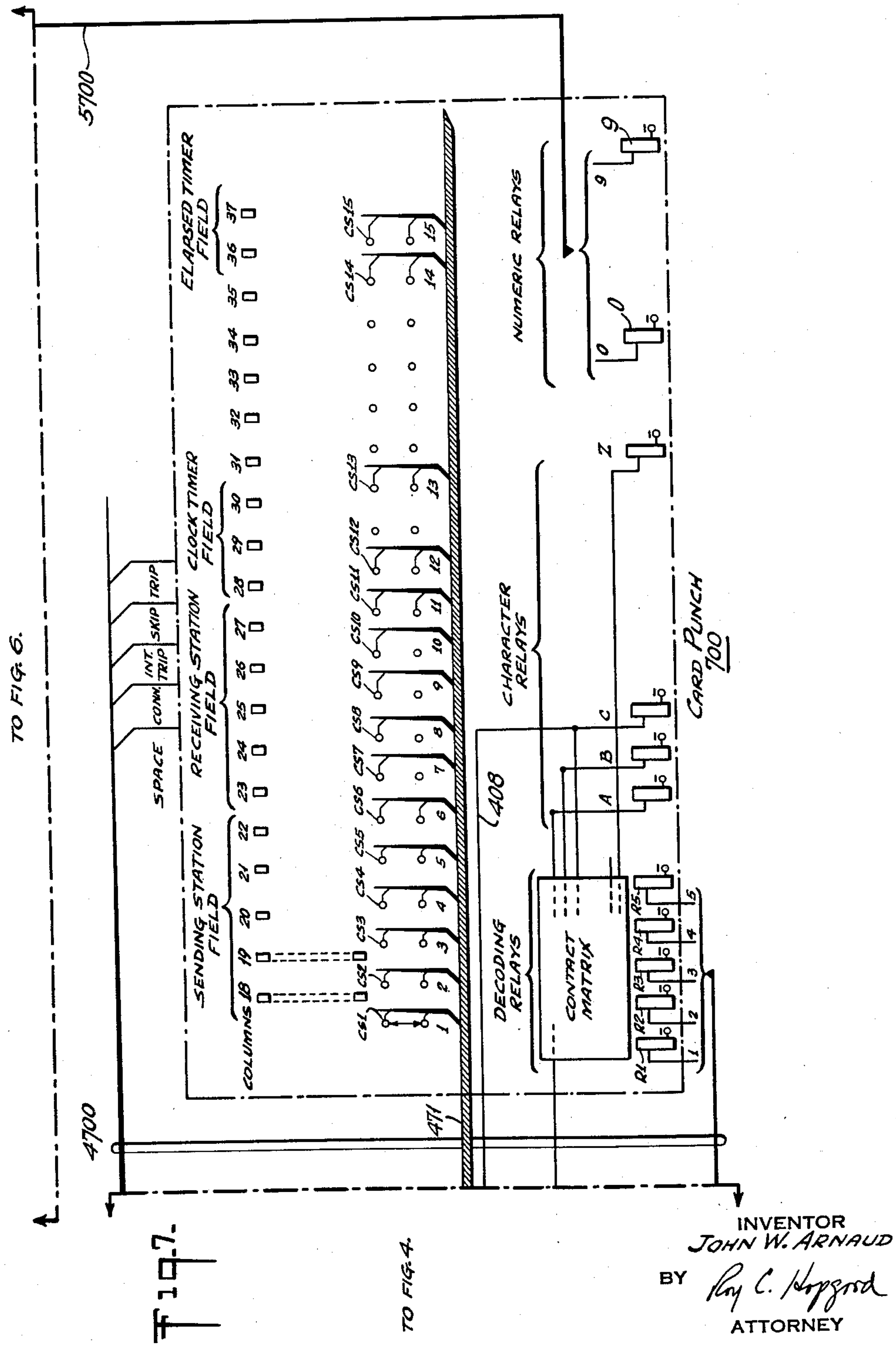
FIG. 7 shows in partial detail, the arrangement of a standard card-punch machine.

*Clock timer operation (FIGS. 5 and 6)*

When the data processing equipment is started at the beginning of each day, the homing key HK (FIG. 5) is depressed to place ground potential on conductors 501, 502 and 503. These ground potentials are extended through any operated off-normal contacts 1 of switches SW1, SW2 and SW3, respectively to the battery-connected stepping magnets thereof. Each of the switches advance step-by-step to home position wherein brushes B1 to B3 are on bank contact 11. At this time, off-normal contacts 2 of each of the switches SW1 to SW3 are opened and the associated lamps are extinguished. The six minute per revolution motor M1 begins a new timing period in controlling the noted three switches.

After the switches SW1 to SW3 are homed, a ground pulse will be delivered over wire 503 once every six minutes from the cam assembly on motor M1. This ground impulse will energize magnet SM of switch SW1 causing it to advance its brushes B1, B2 and B3 one step into electrical contact with bank contacts 1. Successive six-minute interval pulses will advance brushes B1 to B3 of switch SW1 step-by-step across the contact bank.

When brush B1 makes contact with bank contact 9 and the tenth six-minute impulse energizes magnet SM causing it to close its interrupter contacts 4, ground potential from brush B1 is extended over wire 505 to magnet SM of switch SW2, causing it to advance one step.

When brush B1 is stepped to bank contact 10, ground potential is extended through contact set 10 and through the interrupter contacts 3 of magnet SM causing brushes B1, B2 and B3 to be advanced to home position on contact 11. Bank contacts 10 and 11 of the level associated with brushes B2 and B3 are connected together so that wire "0" of each level will be connected to the associated brushes on both positions 10 and 11. Thus, at the end of one hour (ten six-minute pulses), brush B2 of switch SW1 is positioned on bank contact 11 and brush B2 of switch SW2 is positioned on bank contact 1.

When switch SW1 has received 100 six-minute impulses (10 hours), switch SW2 will have advanced ten steps and have caused switch SW3 to advance one step. At this time, brush B2 of SW1 will be positioned at 11, brush B2 of switch SW2 will be positioned at 11 and brush B2 of SW3 will be positioned at 1. It can thus be seen that switch SW1 provides clock time in one-tenth hours, switch SW2 provides clock time in hours and switch SW3 provides clock time in ten hour increments. For example, if the equipment were set at zero position at 8 a.m., then at 12:30 p.m., switch SW1 would be on bank contact 5, switch SW2 would be on bank contact 4, and switch SW3 would be at normal or home position. As will be described hereinafter, the switches are read in reverse order and the time read out in the above example would be 045 showing that the concerned message was transmitted four and five-tenths of an hour after the equipment was started into operation.

Brushes B3 of each of the switches SW1 to SW3 provide a visual indication of the position of respective switches by lighting corresponding ones of the bank lamps BL1 to BL10.

*Recording the clock time*

When ground potential was placed on terminal CT7 as noted, relay T1 was energized.

Relay T1 operates and at its make contacts 2 energizes relay T2 and at its contacts 1 closes 110-volts alternating current to motor M2.

Motor M2 starts rotating and moves cam C1 so that the associated contacts close and hold the 110-volt power source connected to the motor for one cam shaft revolution, at which time cam C1 again opens its contacts.

Throughout the one cam-shaft revolution, cams C2 to C7 close their associated contacts successively, thereby successively energizing terminals CT1 to CT6.

Relay T2 operates and at its contacts 1 closes the 110-volt supply source to motor M3. Relay T2 locks operated through its contacts 2 to the ground on break contacts of relay T3 which is unoperated.

Shortly after terminal CT7 is energized from the ground on jumper 419, the ground potential is removed from conductor CR-LF-LTRS by selector 100.

When cam C2 of motor M2 closes its associated contacts, ground potential is placed on terminal CT1 which is extended by jumper 420 to the battery-connected winding of relay 101.

Relay 101 operates and locks to ground through break contacts on relay 201. As noted relay 201 operates in response to the start-of-message signal V-CR-LF-LTRS appearing at the same time that column switch CS1 is closed.

When relay 101 operates, its break contacts 2 remove ground potential from the column switches to render them inoperative during the return of the carriage to column position 18. When such ground potential is removed, relays 107 and 203 restore.

Shortly thereafter (1/7 seconds), cam C2 opens its associated contacts and cam C3 closes its contacts and extends ground potential over conductor 506 to brush B2 of switch SW3.

Assuming that the time is 12:30 p.m. as above noted the ground on wire 506 is extended through bank contacts 11 and 10 to the conductor "0" in cable 5700 and thence to the numeric relay 0 in card punch 700.

Numeric relay 0 operates and by controls not shown sets the punches and causes them to record the number 0 in column 28 of the record card. Thereafter, the carriage advances to column 29 and closes column switch CS12. At the same time, column switch CS11 is opened.

When cam C3 closes its associated contacts, ground potential is removed from switch SW3 and ground potential appears on brush B2 of switch SW2.

The hereinbefore described operation occurs and the numeric relay 4 is energized, causing the recordation of the number 4 in column 29 of the record card. The punch carriage and link 790 is advanced one step.

When cam 4 closes its associated contacts, the numeric relay 5 is operated and the number 5 is punched in column 30 of the record card. The punch carriage advances to column 31, advancing link 790 to column switch CS13.

With link 790 on column switch CS14, ground potential is extended therethrough over jumper 424 to terminal SKIP of punch 700. The energization of such terminal causes the punch carriage to advance to column 36, the first column of the "time-elapsed" field. At this time, link 790 closes column switch CS14 in preparation for receiving the end-of-message signal which will signify that the time-elapsed timer is to be read and recorded. The operation of the data-recording apparatus in recording the elapsed time of the concerned message will now be described.

*Elapsed-timer operation*

As noted, relay T2 operated when the "end-of-line" signal of the first line of the concerned message was received and locked operated to ground potential at break contacts of relay T3. At this time, motor M3 was started and continued operating during the time the message text was being transmitted.

The elapsed timer 550 operates in a manner similar to that of the clock timer 450. However, timer 550 has only two switches SW4 and SW5 for recording the time interval impulses. Since motor M3 makes one revolution per minute, a stepping impulse will appear in wire 510 which will cause switch SW4 to advance one step. Subsequent impulses on wire 510 will cause brushes B1 to B3 of switch SW4 to advance to the tenth position where an impulse will appear on wire 511 and advance switch SW5 one step. Thereafter, switch SW4 advances to its home position automatically. This operation in advancing switch SW5 is similar to that described for switch SW1 causing switch SW2 to advance. It will thus be seen that switch SW4 provides elapsed time in minutes while switch SW5 provides such time in ten-minute increments.

*Receipt of end-of-message signal*

As hereinbefore noted, the end-of-message signal is composed of the FIGS-H-LTRS characters in sequence, which sequence is detected by sequential selector 100, resulting in ground potential being placed on conductor FIGS-H-LTRS of control panel 300. This ground potential is extended over jumper 420 to terminal P of wire group G2 of cable 450 causing relay 402 to operate.

Make contacts on relay 402 extend ground potential over jumper 421 to terminal ET7 which is connected to the battery-connected winding of relay T3.

Relay T3 operates and at its make contacts closes 110 volts commercial power to motor M4 causing it to operate and rotate cams C1 to C7 thereon. Cam C1 closes its associated contacts to maintain power to motor M4 for one complete revolution independently of contacts on relay T3.

Break contacts 2 on relay T3 open the holding circuit of relay T2, permitting it to release.

Cams C2 to C7 of motor M4 close their associated contacts in sequence and extend ground potential over wires 512 and 513 to brushes B2 of switches SW4 and SW5 to cause the setting of these switches to be recorded in columns 36 and 37 of the record card. This operation is similar to that described for the recording of the settings of the switches SW1 to SW3.

When cam C5 closes its associated contacts to extend ground potential to wire 514 and cam C6 closes its associated contacts thereafter to extend ground potential to wire 515, switches SW4 and SW5 are driven to their home position in the same manner that switches SW1 to SW3 were homed in response to the operation of the homing key HK. At this time, the elapsed timer is in condition to begin the timing of the next successive message.

When the elapsed time information was completely recorded, the punch carriage moves to column 38 and column switch CS15 is closed. At this time, ground potential is extended through column switch CS15 to jumper 423 which is connected to terminal TRIP of the punch, causing it to eject the punched card and to return the carriage to column 18.

When cam C6 of motor M4 closed its associated contacts to ground wire 515 and home switch SW5, it also grounded jumper 422 which interconnects terminal ET6 with terminal TRIP to insure that the carriage will return to column 18 and the punch card will be ejected.

After a predetermined time interval, selector 100 removes ground from the FIGS-H-LTRS conductor and relays 402 and T3 restore. At this time only relay 101 is operated and locked to ground through break contacts on relay 201. The punch carriage is positioned on column 18 and column switch CS1 is closed. The apparatus is now in condition to record predetermined information concerning the next message transmitted over the private-wire circuit.

*Three and four character station abbreviations*

The foregoing description concerned itself with station abbreviations which contained two letters and five letters, respectively. While the description concerned itself with a two-character sending station abbreviation and a five-character receiving station abbreviation, it was pointed out that jumper 413 would ground terminal SKIP if the character relay C was energized when the second column switch CS7 of the receiving station abbreviation was closed. Similarly, if the five-character station abbreviation CLEVE was the sending station abbreviation, the punch carriage would advance to the next column in the same manner as it advanced when such station abbreviation was the receiving station.

The operation of the system will now be described with reference to the sending station abbreviation containing three characters and the receiving station abbreviation containing four characters.

When the third and last character of the three-character sending station abbreviation is received and recorded, column switch CS4 is closed. In the event a three-character receiving station abbreviation were received and recorded, switch CS9 would be closed. In either event, ground potential appearing on jumper 410 is extended through the operated column switch to jumper 424 which is connected to the battery-connected winding of relay 104.

Relay 104 operates and at its make contacts 2 and jumper 425 connect the SPACE conductor of selector 100 to the terminal SKIP of punch 700 over jumper 426.

Thus, since the sending station abbreviation is complete, the operator will have inserted one or more space signals, which signals cause ground potential to be extended to the terminal SPACE and over the above traced path to terminal SKIP, causing the punch carriage to advance to column 23, or in the case of a three-character receiving station abbreviation, causing the carriage to advance to column 28.

The operation of the recording system would then be similar to that described for a two-character or five-character station abbreviation. When the punch carriage advances, as noted, ground potential is removed from the winding of relay 104 and this relay restores.

In the event the sending station abbreviation contained four characters, no "space" signal would be transmitted while column switch CS4 was closed and the next character would be received in the normal manner. If the receiving station abbreviation contained four characters, no "space" signals would be transmitted while column switch CS9 is closed.

When the carriage advances to column 22 or 27, depending on whether the sending or receiving station abbreviation contained four characters, either column switch CS5 or CS10 is closed. At that time, one or more "space" characters will be transmitted, which will result in the operation of relay 104 as above described since column switches CS4 and CS5 are connected in parallel and since column switches CS9 and CS10 are likewise parallel-connected.

It can thus be seen that simple jumper arrangements can adequately control the situations wherein the station abbreviations contain two, three or four characters in succession.

*Separated four-character station abbreviations*

In the event a station abbreviation contains four characters with the first two characters separated from the last two by a space, the operation of the data recording system is as follows:

After the first two characters are received and recorded, the punch carriage is on column 20 or 28 and switch CS3 or CS8 is closed depending upon whether the sending or receiving station abbreviation is just received.

Since the first two characters are followed by a "space" signal, ground potential appears on conductor SPACE from selector 100. Since relay 104 is not energized, this ground is extended over jumper 427 and through either switch CS3 or CS8 to the terminal SPACE of punch 700 over jumper 428 or 429. This causes the punch carriage to advance one column in preparation for receiving the last two characters of the concerned station abbreviation. The operation of the data recording system would then be similar to that hereinbefore described.

From the foregoing description, the data recording system can readily be adapted to respond to any combination of sending and receiving station abbreviations of variable number of characters.

While I have described my invention in connection with specific apparatus, it will be understood that the invention is not limited to the specific embodiment shown and described, but is subject to modification, rearrangement, and substitution of parts and elements without departing from the spirit of the invention.

What I claim is:

1. A data-recording system for monitoring a multi-station telegraph transmission circuit and for recording station designations of variable length and spacing which are transmitted over said circuit, comprising a signal detector connected to said circuit for detecting transmitted station designations, a recorder and associated multi-field record means for recording the said detected designations, and controller means for analyzing the length and spacing of said received designations and for controlling the said recorder in accordance with said analysis to record each said designation in predetermined ones of said fields of said record means.

2. A data-recording system for monitoring a multi-station telegraph transmission circuit and for recording station designations of variable length and spacing which are transmitted over said circuit, comprising a signal detector connected to said circuit for detecting transmitted calling and called station designations, a recorder and associated multi-field record means for recording the said detected station designations, and controller means for analyzing the length, spacing and sequence of said received designations and for controlling the said recording means in accordance with said analysis to record the said calling and called station designations in predetermined sequence in predetermined ones of said fields of said record means.

3. A data-recording system for monitoring a multi-station telegraph transmission circuit and for recording station designations of variable length and spacing which are transmitted in a first code over said circuit, comprising a signal detector connected to said circuit for detecting transmitted coded station designations, a recorder and associated multi-field record means for recording the said detected designations, and controller means for analyzing the length an spacing of said received designations and for controlling the said recording means in accordance with said analysis to record in a second code each said designation in predetermined ones of said fields of said record means.

4. A data-recording system for monitoring a multi-station telegraph transmission circuit and for recording alphabetical station designations of variable length and spacing which are transmitted character by character over said circuit, comprising a signal detector connected to said cricuit for detecting said transmitted characters, a recorder and associated multi-field record means for recording the said detected characters, and controller means for analyzing the said received characters and for controlling the said recorder in accordance with said analysis to record each said received character in predetermined order in predetermined ones of said fields of said record means.

5. A data-recording system for monitoring a multi-station telegraph transmission circuit and for recording alphabetical station designations of variable length and spacing which are transmitted character by character in a multi-element serial code over said circuit, comprising a signal detector for detecting the serial code of each transmitted character and for transmitting a corresponding multi-element instantaneous code indicative of said detected character, and controller means responsive to said detector transmitted codes for analyzing said instantaneous code of each received character and for controlling the said recorder in accordance with said analysis to record each received character in predetermined order in predetermined ones of said fields of said record means.

6. A data-recording system for monitoring a multi-station telegraph transmission circuit and for recording alphabetical station designations having two groups of characters separated from each other which are transmitted character by character over said circuit, comprising a signal detector connected to said circuit for detecting said transmitted groups of characters, a recorder and associated record means for recording the said detected groups of characters, and controller means for detecting the said separation between said received groups of characters and for controlling the said recorder in accordance with said separation detection to record said received groups of characters in separated relationship in predetermined ones of said fields of said record means.

7. A data-recording system for monitoring a multi-station telegraph transmission circuit and for recording transmitted calling and called multi-character station designations which are separated from each other by a first space character with at least one of said designations having two groups of characters separated by a second space character, comprising a signal detector connected to said circuit for detecting said groups of characters and said first and second space characters, a recorder and associated record means for recording the said received designation characters, a controller for detecting the said first and second space characters, and means in said controller for controlling the said recorder in accordance with the detection of the said first space character to record subsequently detected characters in a predetermined field and in accordance with the detection of the said second character to record detected characters in predetermined spaced relationship within the said predetermined field.

8. A data-recording system for monitoring a multi-station telegraph transmission circuit and for recording successively transmitted multi-character station designations in which each character in any designation has a given position therein, comprising a signal detector connected to said circuit for detecting said transmitted characters, a recorder and associated multi-field record means for recording the said detected designation characters, and controller means for detecting each received character and its position in each designation and for controlling the said recorder in accordance with the detection of a predetermined character in a predetermined position to record the last-said character in one of said fields and the next succeeding character in a different one of said fields.

9. A data-recording system for monitoring a multi-station telegraph transmission circuit and for recording multi-character station designations of variable length and spacing which are transmitted over said circuit, comprising a signal detector connected to said circuit for detecting transmitted station designations, a recorder and associated multi-field record means for recording the said detected station designations, and controller means for analyzing the length and spacing of said received designations and for controlling the recording means in accordance with said analysis to record first character of each received station abbreviation in a predetermined position in predetermined ones of said fields of said record means.

10. A data-recording system for monitoring a multi-station telegraph transmission circuit and for recording data pertaining to messages transmitted thereover, comprising a signal detector connected to said circuit for detecting transmitted station designations of variable length and spacing, a recorder and associated multi-field record means for recording the said detected designations, a controller for analyzing the length and spacing of said received designations and for controlling the said recorder in accordance with said analysis to record each said designation in predetermined ones of said record means, clock timing means, and means controlled by the said controller for operating said clock timing means and said recorder to record in a predetermined field of said record means the clock time that the said station designations were transmitted.

11. A data-recording system for use with telegraph transmission circuit over which telegraph signals are transmitted, comprising a signal detector connected to said circuit for detecting the said transmitted signals, a recorder and associated multi-field record means for recording predetermined ones of said detected signals, a controller for analyzing the said detected signals and for controlling the said recorder in accordance with said analysis to record said detected signals in predetermined ones of said fields of said record means, elapsed timer means, means in the said controller responsive to the detection of a first predetermined ones of said signals to start the said elapsed timer means into operation, and means in the said controller responsive to said detection of a second predetermined one of said signals for controlling the said elapsed timer means and recorder to record the time interval between said first and second predetermined signals in one of said fields of said record means.

12. A data-recording system for use with a telegraph transmission circuit over which telegraph signals are transmitted, comprising a signal detector connected to said circuit for detecting the said transmitted signals, a recorder and associated multi-field record means, a controller for analyzing said detected signals, start means in the said controller responsive to the detection of a first predetermined one of said signals for controlling the signal detector to transmit indications of subsequently detected signals to said recorder, stop means in the said controller responsive to the detection of a second predetermined one of said signals for controlling the said signal detector to terminate the said transmission of signal indications, and means in the said recorder for recording said transmitted indications in predetermined fields of said record means.

13. In a data-recording system for monitoring a telegraph transmission circuit and for recording alphabetical station designations of variable length and spacing which are transmitted character by character over said circuit, a signal detector connected to said circuit for detecting said transmitted characters, a recorder and associated multi-field record means for recording the said detected characters, a controller, and means in said controller for analyzing each detected character individually and for controlling the said recorder in accordance with each said character analysis to record each detected character in a predetermined position in a predetermined one of said fields of said record means.

14. In a data-recording system for monitoring a telegraph transmission circuit and for recording alphabetical station designations of variable length and spacing which are transmitted character by character over said circuit, a signal detector connected to said circuit for detecting said transmitted characters, a recorder and associated multi-field record means for recording the said detected characters, and controller means including means for analyzing each detected character individually and for controlling the said recorder in accordance with each said character analysis to record each detected character in a predetermined position in a predetermined one of sadi fields of said record means, the said means for individually analyzing each detected character including separate terminal means for each character of each station designation transmitted and the said recorder including means for separately and sequentially energizing said terminal means as each detected character is recorded.

15. A data-recording system for use with a telegraph transmission circuit over which telegraph signals are transmitted, comprising a signal detector connected to said circuit for detecting the said transmitted signals, a recorder and associated multi-field record means for recording predetermined ones of said detected signals, a controller for analyzing the said detected signals and for controlling the said recorder in accordance with said analysis to record said detected signals in predetermined ones of said fields of said record means, elapsed timer means, means in the said controller responsive to the detection of a first predetermined ones of said signals to start the said elapsed timer means into operation, and means in the said controller responsive to said detection of a second predetermined one of said signals for controlling the said elapsed timer means and recorder to record the time interval between said first and second predetermined siganls in one of said fields of said record means, the said elapsed timer means including a plurality of switches energized in a first sequence to record time intervals and energized in a reverse sequence to provide an indication of said recorded time interval.

16. A data-recording system for use with a telegraph transmission circuit over which telegraph signals are transmitted, comprising a signal detector connected to said circuit for detecting the said transmitted signals, a recorder and associated multi-field record means for recording predetermined ones of said detected signals, a controller for analyzing the said detected signals and for controlling the said recorder in accordance with said analysis to record said detected signals in predetermined ones of said fields of said record means, elapsed timer means, means in the said controller responsive to the detection of a first predetermined ones of said signals to start the said elapsed timer means into operation, and means in the said controller responsive to said detection of a second predetermined one of said signals for controlling the said elapsed timer means and recorder to record the time interval between said first and second predetermined signals in one of said fields of said record means, and means responsive to said recordation of said elapsed time interval for returning said elapsed timing means to normal position.

References Cited in the file of this patent

UNITED STATES PATENTS 2,204,957 Carpenter et al. ---------- June 18, 1940

2,339,803 Potts ------------------- Jan. 25, 1944